United States Patent
Martin et al.

(10) Patent No.: US 10,496,282 B1
(45) Date of Patent: Dec. 3, 2019

(54) ADAPTIVE PORT MANAGEMENT TO MEET SERVICE LEVEL OBJECTIVES USING REINFORCEMENT LEARNING

(71) Applicant: EMC Corporation, Hopkinton, MA (US)

(72) Inventors: Owen Martin, Hopedale, MA (US); Arieh Don, Newton, MA (US); Michael Scharland, Franklin, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 481 days.

(21) Appl. No.: 15/071,862

(22) Filed: Mar. 16, 2016

(51) Int. Cl.
G06F 3/06 (2006.01)

(52) U.S. Cl.
CPC ............ *G06F 3/061* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 2005/0076154 A1* | 4/2005 | Chambliss | H04L 67/1097 710/1 |
| 2015/0364162 A1* | 12/2015 | D'Abreu | G11C 7/1075 711/103 |
| 2016/0179560 A1* | 6/2016 | Ganguli | G06F 9/45558 718/1 |

* cited by examiner

*Primary Examiner* — Denise Tran
(74) *Attorney, Agent, or Firm* — Anderson Gorecki LLP (57) ABSTRACT

Storage group performance targets are achieved by managing resources using discrete techniques that are selected based on learned cost-benefit rank. The techniques include delaying start of IOs based on storage group association, making a storage group active or passive on a port, and biasing front end cores. A performance goal may be assigned to each storage group based on volume of IOs and the difference between an observed response time and a target response time. A decision tree is used to select a correction technique which is biased based on the cost of deployment. The decision tree maintains an average benefit of each technique and over time with rankings based on maximizing cost-benefit.

20 Claims, 5 Drawing Sheets

ADAPTIVE PORT MANAGEMENT TO MEET SERVICE LEVEL OBJECTIVES USING REINFORCEMENT LEARNING

BACKGROUND

The subject matter of this disclosure is generally related to data storage systems that may be used to maintain large data sets and support multiple concurrent users. The basic building blocks of the data storage system may include computing nodes that manage access to data storage devices. The data storage system may include multiple storage arrays, and each storage array may include multiple computing nodes. Each storage array presents one or more logical volumes of storage to host devices. Instances of applications running on the host devices may access the logical volumes by sending IOs to the storage arrays. The computing nodes maintain an abstraction layer between the logical volumes and the data storage devices.

SUMMARY

All examples, aspects and features mentioned in this document can be combined in any technically possible way.

In accordance with an aspect an apparatus comprises: a storage array comprising a multi-core processor, a memory, at least one data storage component, a first port, a second port, and a compliance manager, wherein the storage array maintains a mapping between a plurality of logical volumes and the at least one data storage component, and wherein the storage array comprises a first storage group comprising a first set of the logical volumes presented on the first port and a second storage group comprising a second set of the logical volumes presented on the second port, the first storage group having a first performance objective and the second storage group having a second performance objective, wherein the first performance objective corresponds to a higher level of performance than the second performance objective, the compliance manager comprising program code stored in the memory and implemented by the multi-core processor to cause the first storage group to comply with the first performance objective by reducing a rate at which IOs to the second storage group are serviced. In some implementations the compliance manager reduces the rate at which IOs to the second storage group are serviced by delaying servicing of IOs to the second storage group. In some implementations the compliance manager reduces the rate at which IOs to the second storage group are serviced by delaying dequeueing of IOs received via the second port and enqueued in the memory. In some implementations the compliance manager reduces the rate at which IOs to the second storage group are serviced by causing the second storage group to enter a passive state. In some implementations the second storage group is in the passive state on the second port and in an active state on a third port. In some implementations the compliance manager reduces the rate at which IOs to the second storage group are serviced by reducing a number of processor cores of the multi-core processor used for servicing IOs to the second storage group. In some implementations the compliance manager allocates cores to the first port. In some implementations the compliance manager reduces the rate at which IOs to the second storage group are serviced by implementing at least one response of a group comprising: delaying servicing of IOs to the second storage group; causing the second storage group to enter a passive state on at least one of the ports; and reducing a number of processor cores of the multi-core processor used for servicing IOs to the second storage group. In some implementations the compliance manager maintains a ranking of the responses, alone and in combination. In some implementations the compliance manager updates the ranking of the responses based on previous implementation of the responses by the storage array.

In accordance with an aspect a method comprises: in a storage array comprising: a multi-core processor; a memory; at least one data storage component; a first port; a second port; and a compliance manager, maintaining a mapping between a plurality of logical volumes and the at least one data storage component; maintaining a first storage group comprising a first set of the logical volumes presented on the first port and a second storage group comprising a second set of the logical volumes presented on the second port, the first storage group having a first performance objective and the second storage group having a second performance objective, wherein the first performance objective corresponds to a higher level of performance than the second performance objective; and causing the first storage group to comply with the first performance objective by reducing IOs to the second storage group. In some implementations the method comprises reducing IOs to the second storage group by delaying servicing of IOs to the second storage group. In some implementations the method comprises reducing IOs to the second storage group by delaying dequeueing of IOs received via the second port and enqueued in the memory. In some implementations the method comprises reducing IOs to the second storage group by causing the second storage group to enter a passive state. In some implementations the method comprises causing the second storage group to be in the passive state on the second port and to be in an active state on a third port. In some implementations the method comprises reducing IOs to the second storage group by reducing a number of processor cores of the multi-core processor used for servicing IOs to the second storage group. In some implementations the method comprises allocating cores to the first port. In some implementations the method comprises reducing IOs to the second storage group by implementing at least one response of a group comprising: delaying servicing of IOs to the second storage group; causing the second storage group to enter a passive state on at least one of the ports; and reducing a number of processor cores of the multi-core processor used for servicing IOs to the second storage group. In some implementations the method comprises maintaining a ranking of the responses, alone and in combination. In some implementations the method comprises updating the ranking of the responses based on previous implementation of the responses by the storage array.

DETAILED DESCRIPTION

Some aspects, features and implementations described herein may comprise computer devices, components and computer-implemented steps or processes. It should be apparent to those of ordinary skill in the art that the computer-implemented steps or processes may be stored as computer-executable instructions on a non-transitory computer-readable medium. Furthermore, it should be understood by those of ordinary skill in the art that the computer-executable instructions may be executed on a variety of tangible processor devices. For ease of exposition, not every step, process or element is described herein as part of a computer system. Those of ordinary skill in the art will recognize steps, processes and elements that may have a corresponding computer system or software component. Such computer system and software components are therefore enabled by describing their corresponding steps, processes or elements, and are within the scope of the disclosure.

The terminology used in this description is intended to be interpreted broadly within the limits of subject matter eligibility. The terms "logical" and "virtual" are used to refer to features that are abstractions of other features or tangible devices. For example, multiple virtual computing devices could operate simultaneously on one tangible computing device. A "host application" is a computer program that accesses a storage service from a storage system via a storage network. A "volume" is a logical unit of storage presented by a storage system for use by host applications. The storage system manages the underlying tangible storage components used to implement the storage services for the volume. A "data device" is a logical unit of storage that is used within a storage array to manage access to tangible storage components that are used to deliver storage services. A "storage resource pool" is a collection of data devices.

Figure 1:
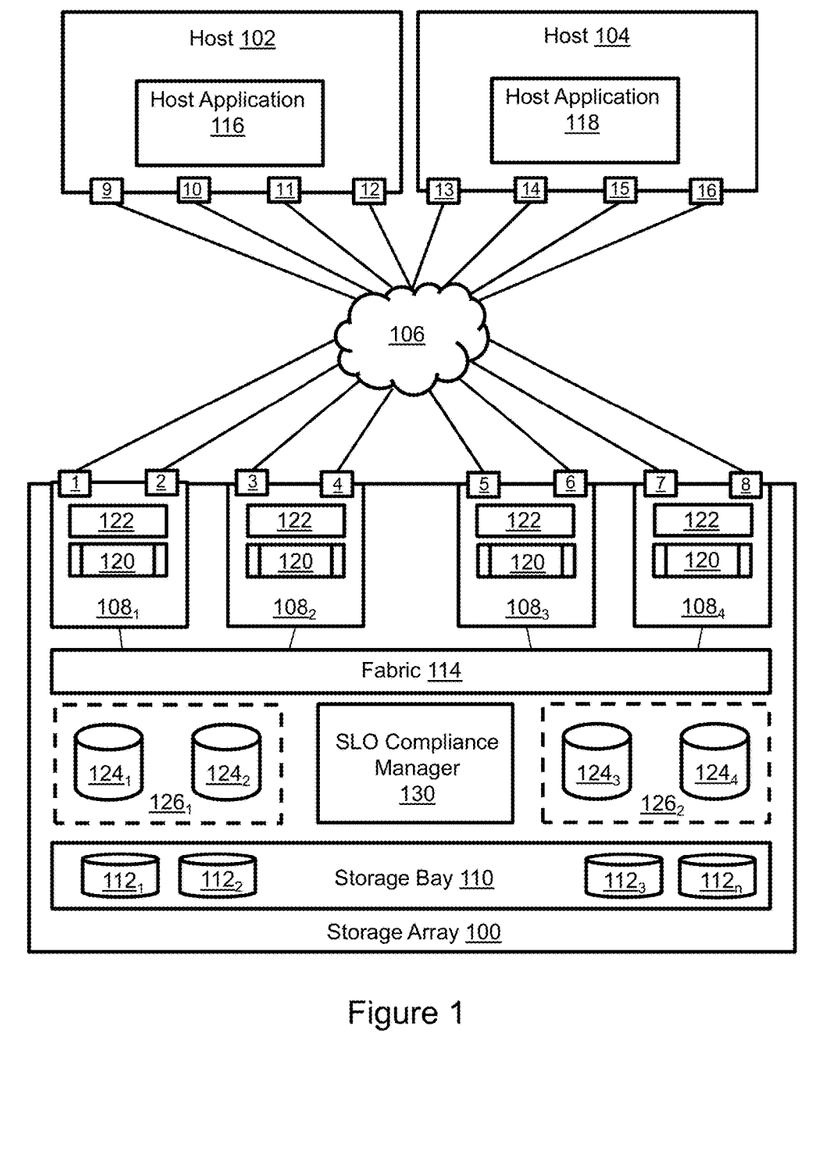
FIG. 1 illustrates a storage array with an SLO compliance manager.

FIG. 1 illustrates an exemplary data storage system with a data storage array 100 and multiple host devices 102, 104. Any number of host devices and storage arrays could be included in the data storage system. The host devices 102, 104 are connected to the storage array 100 by a network 106. The network 106 may include various network nodes, e.g. switches, routers, hubs, and other network devices. For context and without limitation the network 106 may include one or more of a WAN (wide area network), MAN (metropolitan area network) and LAN (local area network).

The storage array 100 includes one or more interconnected computing nodes $108_1$-$108_4$ and a storage bay 110. The computing nodes may include "vanilla" storage servers and specialized hardware platforms including but not limited to storage directors and storage engines. Each computing node includes a multi-core processor 120 and volatile memory 122, e.g. and without limitation RAM (random access memory). The storage bay 110 may include multiple tangible data storage components $112_1$-$112_n$ of various different technology types, e.g. and without limitation flash drives, SATA drives and FC (Fibre Channel) drives. However, for explanatory purposes the storage bay 110 will be considered to have storage components of a single technology type, e.g. flash drives. Each computing node is connected to every other computing node in the storage array via point-to-point links of an interconnecting fabric 114. The computing nodes are also connected to the storage bay. The storage array is connected to the network 106 via front end ports 1-8. In particular, ports 1-2 are associated with computing node $108_1$, ports 3-4 are associated with computing node $108_2$, ports 5-6 are associated with computing node $108_3$, and ports 7-8 are associated with computing node $108_4$.

Each host 102, 104 may be a tangible server computer (with memory, storage and processors) or a virtual host associated with a virtual machine or container running on a tangible server computer. The hosts operate host applications 116, 118 that utilize the storage services of the storage array. Examples of host applications include but are not limited to a database, file server and block server. Each host includes one or more ports. In the illustrated example host 102 includes ports 9-12 and host 104 includes ports 13-16. The host ports are connected to the network 106, and each host port may be associated with a path to a particular storage array port. For example, port 9 may be associated with a path to port 1, port 10 may be associated with a path to port 3, port 11 may be associated with a path to port 5, port 12 may be associated with port 7, and so on for port pairings (13, 2), (14, 4), (15, 6) and (16, 8) for host 104. The host may also have ports associated with standby front end ports of the storage array. Further, it should be understood that any number of ports may be included and the hosts do not necessarily have access to all of the front end ports.

The computing nodes maintain logical volumes $124_1$, $124_2$, $124_3$, $124_4$ of storage that are presented to the hosts 102, 104 by the storage array. The logical volumes are backed by the tangible storage components $112_1$-$112_n$ of the storage bay 110. In other words, each logical volume is mapped to one or more tangible storage components. While not necessary for an understanding the inventive concepts, the logical volumes may be partially backed by storage components located outside of the storage array, and an abstraction layer of storage devices may be used to represent the internal and external storage components. In the illustrated example host 102 may access logical volume $124_1$ via any of ports 1, 3, 5 and 7, and host 104 may access logical volume $124_3$ via any of ports 2, 4, 6 and 8. IOs may be distributed or balanced across ports.

The logical volumes $124_1$, $124_2$, $124_3$, and $124_4$ are organized into storage groups $126_1$, $126_2$. Each storage group includes at least on logical volume, and there may be any number of logical volumes and storage groups. The storage groups may be used to provide differentiated performance to different host applications or functions. The host applications 116, 118 may have different storage performance requirements. For example, host application 116 may require a response time of <5 msec and host application 118 may require a response time of <10 msec. Moreover, different functions of a single host application may have different storage performance requirements. For example, a first function of host application 116 may require a response time of <5 msec and second function of host application 116 may require a response time of <10 msec. Storage groups may have different storage performance targets. For example, storage group $126_1$ may have a SLO (service level objective) of a response time of <5 msec, and storage group $126_2$ may have a SLO (service level objective) of a response time of <10 msec. Host applications and host application functions may be associated with specific storage groups based on storage performance requirements so that appropriate levels of performance are provided for host application function and performance. For example, host application 116 may utilize storage group $126_1$ based on the alignment of host application storage performance requirements with the SLO of storage group $126_1$. Similarly, host application 118 may utilize storage group $126_2$ based on the alignment of the host application storage performance requirements with the SLO of storage group $126_2$. A single host application may utilize different storage groups for different functions based on storage performance requirements of those functions and SLOs.

In a hybrid array where the storage bay includes storage components of different technology types the performance differences of the storage groups may be mainly a function of tiering. For example, each storage group may include different types of storage components that account for differences in performance. Higher performance storage media may be allocated to storage groups having higher performance SLOs, and lower performance storage media may be allocated to storage groups having lower performance SLOs. However, in a monolithic storage bay in which the storage components have similar or identical performance capability the IOs associated with the lower performance storage group $126_2$ may compete with and degrade the performance of the higher performance storage group $126_1$ due to overall increased utilization of front end ports, memory and processing resources of the computing nodes relative to a hybrid storage array. Such resource utilization by lower performing storage groups may be problematic if it causes higher performing storage groups to fall out of SLO compliance.

An SLO compliance manager 130 helps to maintain storage group SLO compliance. The SLO compliance manager may include program code in the memory 122 of the computing nodes that is utilized by the processors 120 of the computing nodes to control port and processor resource utilization by individual storage groups. The SLO compliance manager may have different resource utilization control functions that can be used alone or in combination as will be described in greater detail below.

Figure 2:
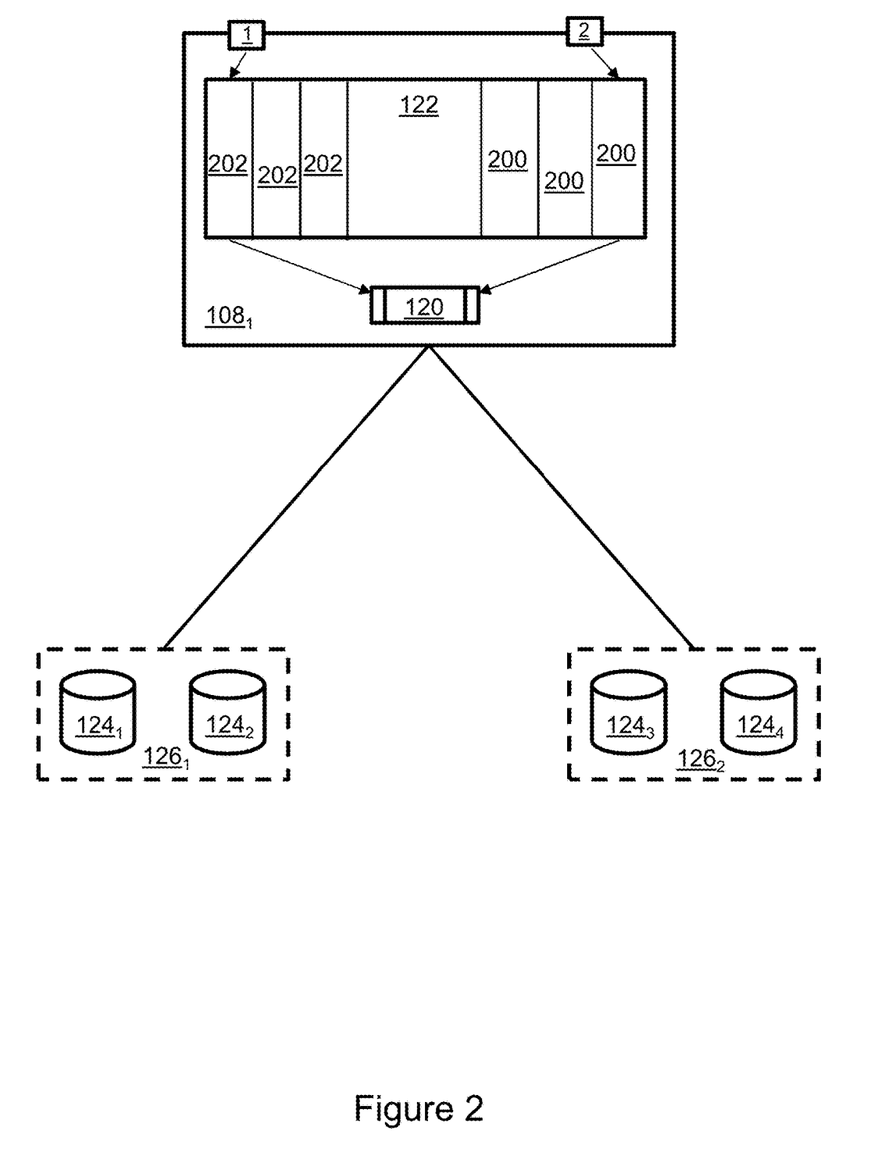
FIG. 2 illustrates preferential servicing of IOs based on queueing.

Referring to FIGS. 1 and 2, a first resource control function is to control the start time at which IOs are serviced. IOs received by the computing nodes may be enqueued in computing node memory 122 while awaiting service. Rather than selecting an IO for dequeueing based on when it was enqueued, e.g., first-in-first-out, the selection of IOs for service may be differentiated based on storage group or front end port. In other words, IOs associated with higher performance SLO storage group $126_1$ may be preferentially selected for service over IOs associated with lower performance SLO storage group $126_2$. This may be implemented in a wide variety of different ways including but not limited to delayed start of IOs received on a port or set of ports when there is contention for the port or set of ports associated with the lower performance SLO storage group, e.g. slow start queues 200 for IOs received on port 2 and fast start queues 202 for IOs received on port 1. However that is only one example and a wide variety of weighted selection algorithms might be used. The preferential selection may be implemented across all ports via which the associated storage group is accessed, e.g. across ports 2, 4, 6 and 8, so that IOs are not rebalanced across ports by the host 104 in response. Thus, IOs received on port 1 of computing node $108_1$ would receive preferential service over IOs received on port 2.

Figure 3:
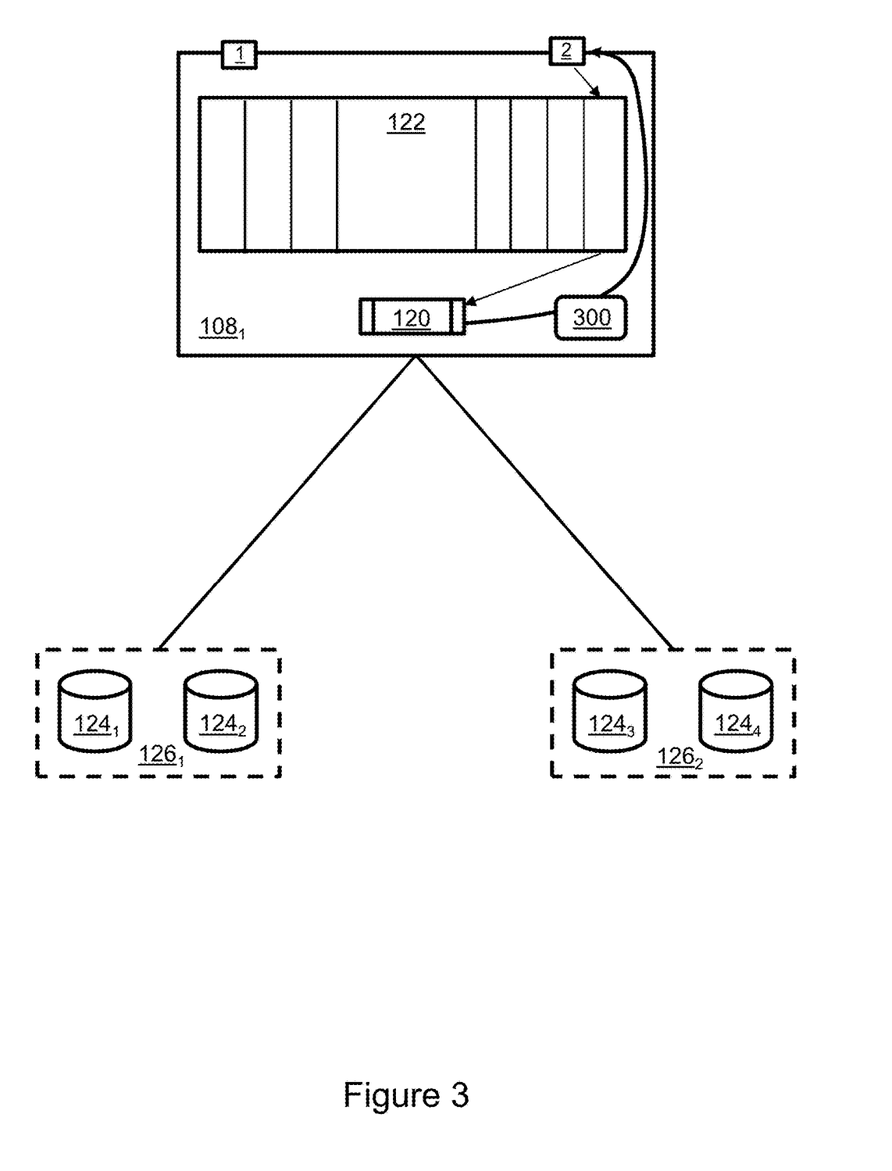
FIG. 3 illustrates port-specific storage group passivity.

Referring to FIGS. 1 and 3, a second resource control function is to control the state of logical volumes of the storage group on individual ports, e.g. whether the logical volumes of the storage group are is "active" or "passive" on specific ports. A logical volume can be made passive on a port using a protocol response 300 that is sent to the host. For example, logical volume $124_4$ can be made passive on port 2 by responding to an IO received on port 2 from host application 118 with the protocol response SCSI check condition 02:05:25, where 02 indicates a problem and 05:25 indicates a problem type. The logical volume $124_4$ then appears to the host application as passive on port 2 but may still appear as active on ports 4, 6 and 8. In other words, port 2 may be seen as a passive port while ports 4, 6 and 8 are active ports with regard to logical volume $124_4$. The host 104 and host application 118 should always be able to access the storage group via one or more active ports in order to maintain host application operation. However, the number of active ports servicing IOs for the lower performance SLO storage group $126_2$ can be quickly changed by causing one or more of the active ports through which the storage group is accessed to become passive with respect to the storage group. A passive port may be returned to the active state.

Figure 4:
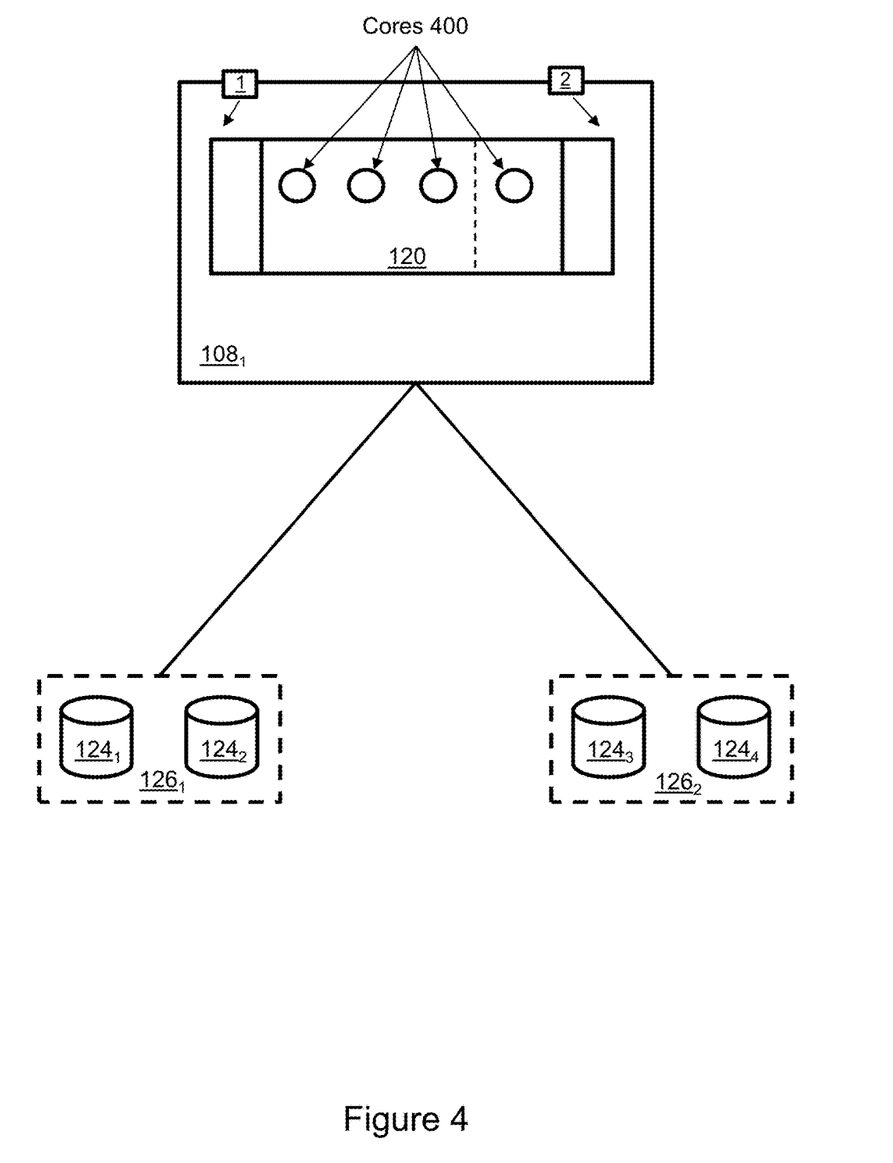
FIG. 4 illustrates allocation of processor cores.

Referring to FIGS. 1 and 4, a third resource control function is to control allocation of processor cores 400 of the processors 120 that are used for individual storage groups. This may be implemented by assigning (allocating) processor cores for servicing threads associated with IOs for a particular storage group or port. In the simplified example shown, 75% of the cores 400 are allocated to port 1 and 25% of the cores are allocated to port 2. Thus, at least in general, more of the IOs received on port 1 will be serviced than IOs received on port 2 per unit of time.

Figure 5:
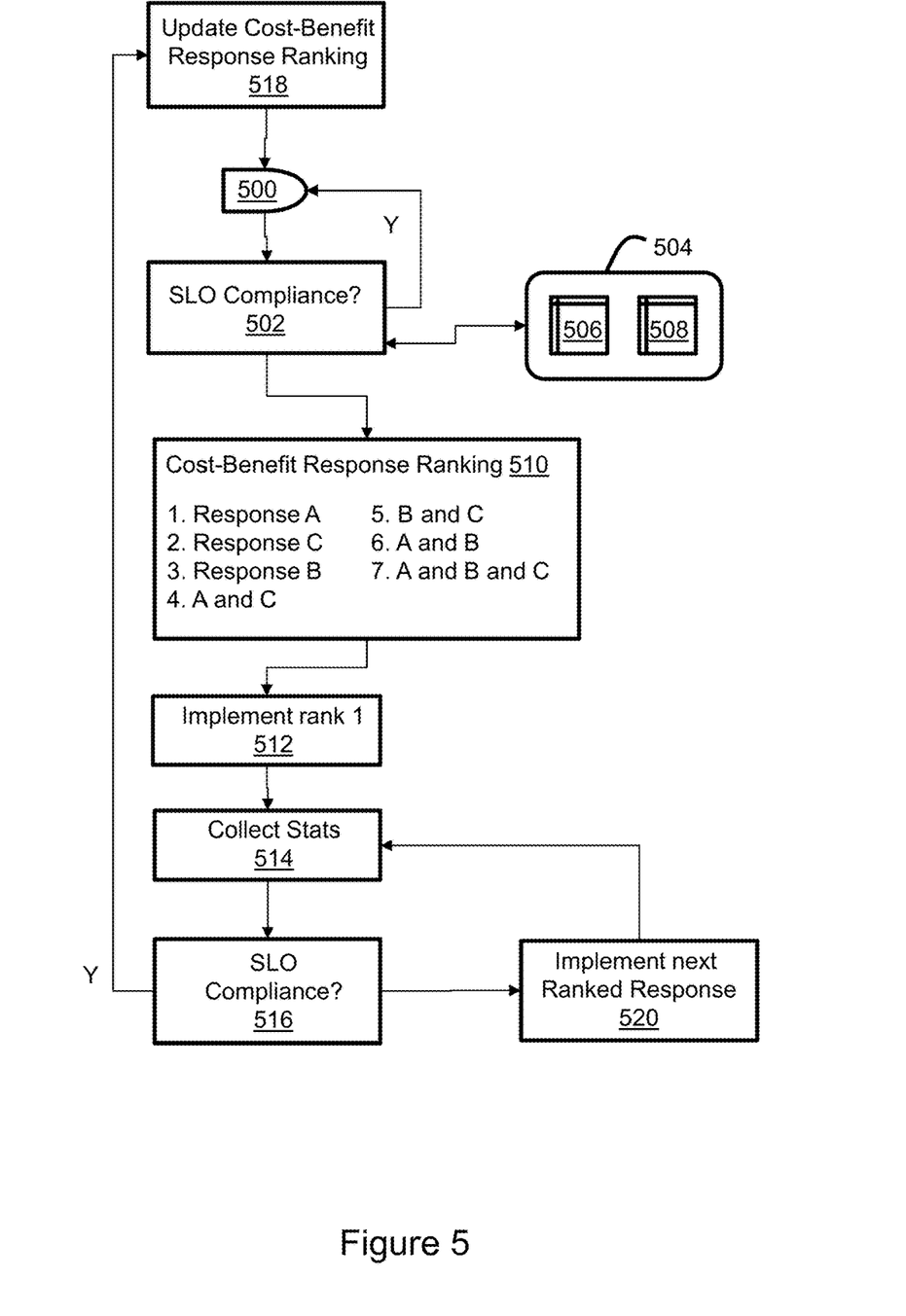
FIG. 5 illustrates operation of the SLO compliance manager.

FIG. 5 is a state-flow diagram that illustrates operation of the SLO compliance manager of FIG. 1. Block 500 represents a starting point for iterative looping. The starting point could be implemented with a countdown timer or trigger, for example and without limitation. SLO compliance state of the storage groups is determined in block 502. SLO compliance may be determined with reference to a data record 504 that includes a performance histogram 506 indicative of performance of storage group $126_1$ and a performance histogram 508 indicative of performance of storage group $126_2$. The histograms may indicate whether any IOs are serviced out of SLO compliance, quantify the proportion of IOs that are serviced out of compliance, and quantify how far out of compliance IOs are being serviced, for example and without limitation. If the histograms indicate that the storage groups are within SLO compliance then flow returns to block 500 until another iteration begins. If the histograms indicate that one or more of the storage groups are out of SLO compliance then a cost-benefit ranking of responses is consulted as indicated in block 510. The cost-benefit ranking indicates a current rank of the resource control functions, alone and in combination. The ranking may be based on historical cost-benefit value to the storage array. For context, response A might be preferential servicing of IOs based on control of input queues as described above, response B might be port-specific storage group passivity as described above, and response C might be allocation of processor cores as described above. The cost portion of the ranking may include quantification of implementation delay. For example, greater time required to achieve performance improvement may be associated with greater cost. The benefit portion of the ranking may include quantification of magnitude of performance improvement and success rate. The rank 1 response is selected and implemented as indicated in block 512. Performance statistics are then collected as indicated in block 514. The performance statistics indicate the performance improvement realized by implementing the rank 1 response. The performance statistics may also be used to determine SLO compliance as indicated in block 516. If SLO compliance is achieved then the cost-benefit response ranking is updated as indicated in block 518. For example, the success rate of the successful response may improve. If SLO compliance is not achieved then the next highest ranked response is implemented as indicated in block 520. For example, the first ranked response (response A) is de-implemented and the second ranked response (response C) is implemented. Performance statistics are collected and SLO compliance determined again as shown in blocks 514 and 516. Iterations continue until a successful response is selected and implemented. As indicated in block 510, the responses may be ranked and implemented alone and in various combinations. The success of a lower ranked response may change the rankings after the update. In particular, the values representing cost and benefit may be updated. Consequently, the SLO compliance manager learns which responses are most likely to help avoid SLO non-compliance and may reinforce that learning by confirming which responses continue to be most likely to help avoid SLO non-compliance and adapting to changes in how the array is used over time. This may be helpful because different responses and combinations of responses may have different cost-benefit relationships with different host applications and data types, and usage of the storage array may evolve over time, e.g. via use of different host applications.

In some implementations a goal is assigned to each storage group based on the 10 volume and a difference between observed response time and the target response time. A value indicative of % of all IOs failing to satisfy the SLO response time may be used as the criterion of optimality. The response ranking may include a decision tree based on the average benefit of the responses over time.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
    a storage array comprising a multi-core processor, a memory, at least one data storage component, a first port, a second port, and a compliance manager, wherein the storage array maintains a mapping between a plurality of logical volumes and the at least one data storage component, and wherein the storage array comprises a first storage group comprising a first set of the logical volumes presented on the first port and a second storage group comprising a second set of the logical volumes presented on the second port, the first storage group having a first performance objective and the second storage group having a second performance objective, wherein the first performance objective corresponds to a higher level of performance than the second performance objective, the compliance manager comprising program code stored in the memory and implemented by the multi-core processor to cause the first storage group to comply with the first performance objective by reducing a rate at which IOs to the second storage group are serviced.

2. The apparatus of claim 1 wherein the compliance manager reduces the rate at which IOs to the second storage group are serviced by delaying servicing of IOs to the second storage group.

3. The apparatus of claim 1 wherein the compliance manager reduces the rate at which IOs to the second storage group are serviced by delaying dequeueing of IOs received via the second port and enqueued in the memory.

4. The apparatus of claim 1 wherein the compliance manager reduces the rate at which IOs to the second storage group are serviced by causing the second storage group to enter a passive state.

5. The apparatus of claim 4 wherein the second storage group is in the passive state on the second port and in an active state on a third port.

6. The apparatus of claim 1 wherein the compliance manager reduces the rate at which IOs to the second storage group are serviced by reducing a number of processor cores of the multi-core processor used for servicing IOs to the second storage group.

7. The apparatus of claim 6 wherein the compliance manager allocates cores to the first port.

8. The apparatus of claim 1 wherein the compliance manager reduces the rate at which IOs to the second storage group are serviced by implementing at least one response of a group comprising:
    delaying servicing of IOs to the second storage group;
    causing the second storage group to enter a passive state on at least one of the ports; and
    reducing a number of processor cores of the multi-core processor used for servicing IOs to the second storage group.

9. The apparatus of claim 8 wherein the compliance manager maintains a ranking of the responses, alone and in combination.

10. The apparatus of claim 9 wherein the compliance manager updates the ranking of the responses based on previous implementation of the responses by the storage array.

11. A method comprising:
    in a storage array comprising: a multi-core processor; a memory; at least one data storage component; a first port; a second port; and a compliance manager,
    maintaining a mapping between a plurality of logical volumes and the at least one data storage component;
    maintaining a first storage group comprising a first set of the logical volumes presented on the first port and a second storage group comprising a second set of the logical volumes presented on the second port, the first storage group having a first performance objective and the second storage group having a second performance objective, wherein the first performance objective corresponds to a higher level of performance than the second performance objective; and
    causing the first storage group to comply with the first performance objective by reducing IOs to the second storage group.

12. The method of claim 11 comprising reducing IOs to the second storage group by delaying servicing of IOs to the second storage group.

13. The method of claim 11 comprising reducing IOs to the second storage group by delaying dequeueing of IOs received via the second port and enqueued in the memory.

14. The method of claim 11 comprising reducing IOs to the second storage group by causing the second storage group to enter a passive state.

15. The method of claim 14 comprising causing the second storage group to be in the passive state on the second port and to be in an active state on a third port.

16. The method of claim 11 comprising reducing IOs to the second storage group by reducing a number of processor cores of the multi-core processor used for servicing IOs to the second storage group.

17. The method of claim 16 comprising allocating cores to the first port.

18. The method of claim 11 comprising reducing IOs to the second storage group by implementing at least one response of a group comprising:
    delaying servicing of IOs to the second storage group;
    causing the second storage group to enter a passive state on at least one of the ports; and reducing a number of processor cores of the multi-core processor used for servicing IOs to the second storage group.

19. The method of claim 18 comprising maintaining a ranking of the responses, alone and in combination.

20. The method of claim 19 comprising updating the ranking of the responses based on previous implementation of the responses by the storage array.

* * * * *